(12) United States Patent
Jana

(10) Patent No.: US 12,505,045 B2
(45) Date of Patent: Dec. 23, 2025

(54) DATA STORAGE CONTROLLER

(71) Applicant: Avago Technologies International Sales Pte. Limited, Singapore (SG)

(72) Inventor: Arun Prakash Jana, Bangalore (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 199 days.

(21) Appl. No.: 18/481,230

(22) Filed: Oct. 4, 2023

(65) Prior Publication Data

US 2025/0117332 A1    Apr. 10, 2025

(51) Int. Cl.
G06F 12/08    (2016.01)
G06F 12/0866    (2016.01)

(52) U.S. Cl.
CPC .... G06F 12/0866 (2013.01); *G06F 2212/205* (2013.01)

(58) Field of Classification Search
CPC ............ G06F 12/0866; G06F 12/0868; G06F 12/0888; G06F 3/061; G06F 3/0619; G06F 3/065; G06F 3/0656; G06F 2212/1032; G06F 2212/1041; G06F 2212/205; G06F 2212/217; G06F 2212/262; G06F 2212/312
See application file for complete search history.

(56) References Cited

U.S. PATENT DOCUMENTS

| | | | |
|---|---|---|---|
| 7,293,145 B1 | 11/2007 | Baird et al. | |
| 7,340,640 B1 | 3/2008 | Karr et al. | |
| 7,631,143 B1 | 12/2009 | Niver et al. | |
| 7,636,814 B1 | 12/2009 | Karr et al. | |
| 7,669,007 B2 | 2/2010 | Fairhurst et al. | |
| 8,612,675 B2 | 12/2013 | Matsumura et al. | |

(Continued)

FOREIGN PATENT DOCUMENTS

JP    5691227 B2    4/2015

OTHER PUBLICATIONS

"Basic RAID Concepts," Sun StorEdge 3000 Family RAID Firmware 4.2x User's Guide, Appendix A, 2009, retrieved from Internet: <https://docs.oracle.com/cd/E19168-01/817-3711-18/appa_basics.html>.

(Continued)

*Primary Examiner* — Tracy C Chan (57) ABSTRACT

A data storage controller is provided that includes: a computer-readable storage medium storing one or more sequences of instructions; and one or more processors configured to execute the one or more sequences of instructions to: receive a host write request for a logical drive corresponding to a redundant array of physical drives, wherein the redundant array of physical drives comprises a first physical drive of a first drive type and a second physical drive of a second drive type different from the first drive type, and wherein data stored on the first physical drive is mirrored on the second physical drive; generate and issue a first input-output (IO) request for the first physical drive based on the host write request and a first cache policy associated with the first drive type; and generate and issue a second IO request for the second physical drive based on the host write request and a second cache policy associated with the second drive type, wherein the first cache policy is different from the second cache policy.

20 Claims, 5 Drawing Sheets

(56) References Cited

U.S. PATENT DOCUMENTS

| | | | |
|---|---|---|---|
| 9,710,383 B1 | 7/2017 | Xu et al. | |
| 10,019,362 B1 | 7/2018 | Chatterjee et al. | |
| 10,234,929 B2 | 3/2019 | Kobayashi et al. | |
| 10,620,850 B1 | 4/2020 | Xu et al. | |
| 2010/0312960 A1* | 12/2010 | Bert | G06F 12/0866 |
| | | | 711/216 |
| 2011/0022801 A1 | 1/2011 | Flynn | |
| 2013/0091319 A1* | 4/2013 | Cho | G06F 12/0888 |
| | | | 711/E12.001 |

OTHER PUBLICATIONS

"Difference Between RAID 0 and RAID 1," Jul. 26, 2018, TechDifferences.com, retrieved from Internet: <https://techdifferences.com/difference-between-raid-0-and-raid-1.html>.

\* cited by examiner

DATA STORAGE CONTROLLER

TECHNICAL FIELD

The present description relates in general to data storage including redundant data storage systems.

BACKGROUND

Redundant data storage systems may utilize multiple storage devices to protect against data loss in the event of data corruption or device failure. For example, RAID (redundant array of independent disks) systems store data across an array of storage devices and use techniques such as data striping, data mirroring, and/or data parity information to protect against data loss. Like many technologies, RAID systems involve a variety of tradeoffs between costs in implementing the systems and the relative performance of the systems.

BRIEF DESCRIPTION OF THE DRAWINGS

Certain features of the subject technology are set forth in the appended claims.

However, for purposes of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form in order to avoid obscuring concepts of the subject technology.

RAID (redundant array of independent disks) systems store data across an array of storage devices and use techniques such as data striping, data mirroring, and/or data parity information to protect against data loss. Different RAID levels provide varied amounts of data mirroring or redundancy. For example, RAID level 0 utilizes data striping to store data across the array of disks or drives but provides no data redundancy. RAID level 1, on the other hand, supports 1:1 redundancy using one or more pairs of peer drives with each peer drive mirroring the data stored on the other peer drive in the pair. RAID levels that use data parity information, such as RAID level 5, also may support a smaller amount of data redundancy (e.g., n: 1 redundancy where n>=2). But read and write operations in these systems typically take longer than those in RAID levels 0 and 1 due at least in part to the number of disk operations and parity calculations typically involved in these operations.

The types of storage devices used to build out an array can impact both the cost and performance of the storage system. Solid-state drives (SSDs) offer advantages over hard disk drives (HDDs). In this regard, SSDs typically provide better performance with quicker execution of read and write operations than HDDs can provide. If SSDs and HDDs are used together in an array, the worst-case performance of the storage system may be determined by the slower speeds of the HDDs. Caching can be used to bridge the performance gap between HDDs and SSDs. Using a write-back cache policy, data is written to a quicker cache memory (e.g., SRAM, DRAM) and completion of the write operation is reported back to the requesting entity independent of writing the cached data to a slower HDD. Using the data stored in the cache memory, the HDD is updated asynchronously with the write operations thereby minimizing the impact of the latencies of the HDD on the overall performance of the system.

While caching may improve the performance of HDDs, caching provides little to no advantage if used with SSDs. Write performance of SSDs allows a write-through cache policy to be applied where data is written to the SSD synchronously with the write operations and completion is reported to the requesting entity after the SSD completes the write operation. The data may be written simultaneously to a cache memory or using the cache memory may be bypassed under this policy. The advantages of SSDs come at a price with SSDs typically being more expensive than similarly sized HDDs. Accordingly, using SSDs to provide data redundancy in a RAID system generally is not cost effective.

The subject technology improves the performance and costs of RAID storage systems by providing a hybrid RAID storage system where the array of storage devices includes two different types of storage devices such as SSDs and HDDs. The array in this hybrid system is organized such that each drive in the array is paired with a peer drive of a different device type that mirrors the data to provide data redundancy (e.g., 1:1 data redundancy). With this arrangement, an HDD will have an SSD as a peer and, correspondingly, an SSD will have an HDD as a peer. To improve the performance of the HDDs with caching while not hampering the performance of the SSDs, the subject technology proposes configurations in which cache policies applied for one type of storage device are independent of cache policies applied for another type of storage device. In this manner, the SSDs in the array can take advantage of a write-through cache policy while HDDs can obtain the performance boost of a write-back cache policy. These and other advantages will be readily apparent based on the description provided below.

Figure 1:
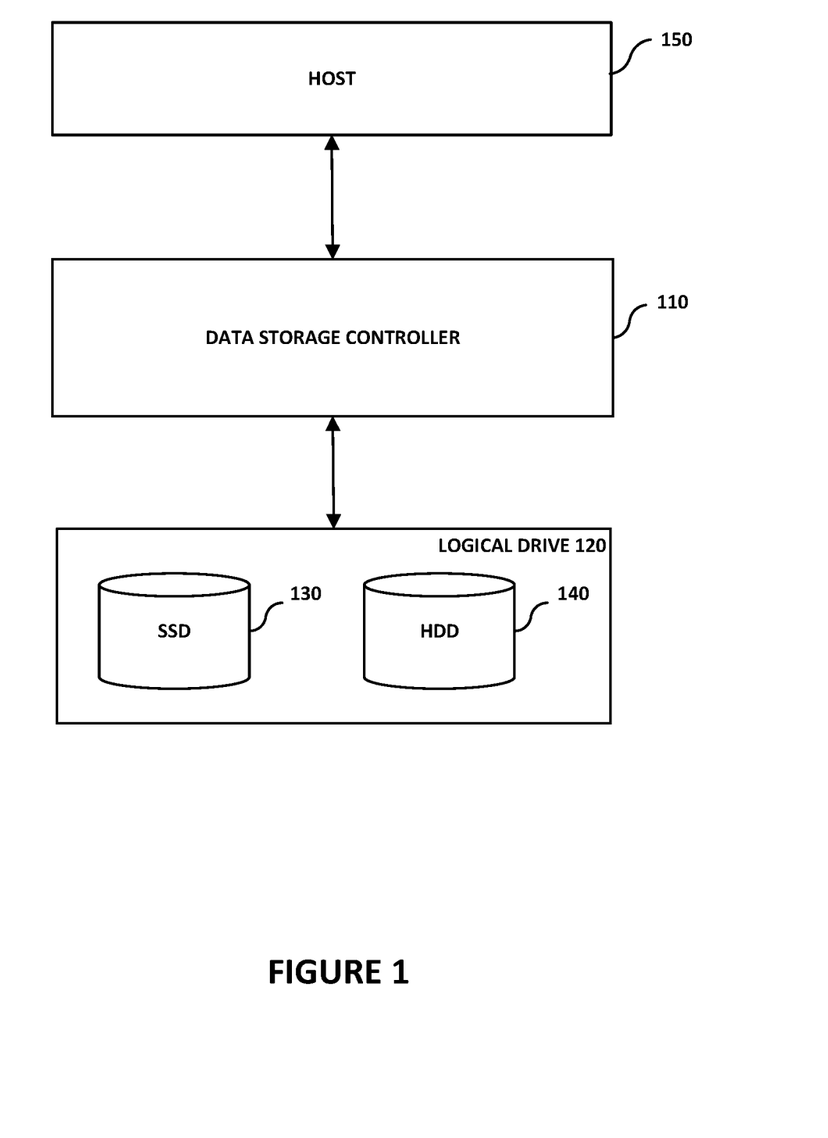
FIG. 1 illustrates an example of a data storage system in which aspects of the subject technology may be implemented.

FIG. 1 is a block diagram illustrating an example of a data storage system in which aspects of the subject technology may be implemented. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 1, the example data storage system includes data storage controller 110 and logical drive 120. In this example, logical drive 120 includes two physical drives, solid-state drive (SSD) 130 and hard disk drive (HDD) 140, configured to store and retrieve data in response to input/output (IO) requests generated by data storage controller 110. Data storage controller 110 may be configured to use SSD 130 and HDD 140 as a pair of peer storage devices where data stored on one of the peer storage devices is mirrored on the other peer storage device to provide data redundancy using configurations such as RAID level 1. Logical drive 120 represents the abstraction of SSD 130 and HDD 140 being presented by data storage controller 110 as a single storage device to other systems or devices such as host 150 for data storage purposes. In this regard, data access requests generated by host 150 may be directed to logical drive 120 with no knowledge of the arrangement of the physical drives that make up logical drive 120. The data access requests from host 150 are processed by data storage controller 110 which generates corresponding IO requests for the individual physical drives, SSD 130 and HDD 140. Responses to the IO requests generated by SSD 130 and HDD 140 are processed by data storage controller 110 for internal use by data storage controller 110 or for data storage controller 110 to generate responses to data access requests received from host 150. The operations of data storage controller 110 are described in more detail below.

As noted above, SSDs and HDDs have different advantages such that pairing these two types of devices as peer devices for data redundancy using independent cache policies can provide an efficient and cost-effective data storage solution. SSD 130 and HDD 140 are not limited to any particular types of SSDs or HDDs. For example, SSD 130 may be implemented using an SSD having a nonvolatile memory express (NVME) interface and HDD 140 may be implemented using a HDD having an SAS (Serial-Attached SCSI (Small Computer System Interface)) interface or an SATA (Serial AT Attachment) interface. Beyond different types of SSDs and HDDs, the subject technology may be applied to other combinations of storage device types that may operate more effectively using different respective types of cache policies.

Logical drive 120 is depicted in FIG. 1 as including a single pair of peer storage devices, SSD 130 and HDD 140. The subject technology is not limited to a single pair of peer storage devices operating as a logical drive and may be implemented using multiple pairs of peer storage devices. In addition, the subject technology is not limited to the RAID level 1 configuration for data redundancy and may be implemented using other configurations (both RAID and non-RAID) that provide some level of data redundancy such as RAID level 10 and RAID level 1E. Furthermore, data storage controller 110 may control the operations of more than one logical drive having the same or different configurations of physical drives.

Host 150 represents any system or device capable of communicating with data storage controller 110 and configured to generate data access requests directed to logical drive 120 or another logical drive (not shown) controlled by data storage controller 110. Data storage controller 110 may be part of a card or other device that is installed within host 150 or may be communicatively coupled to host 150 via a network or a direct connection mechanism. The subject technology also is not limited to data storage controller 110 processing data access requests from a single host and may support multiple hosts issuing data access requests directed to logical drive 120.

Figure 2:
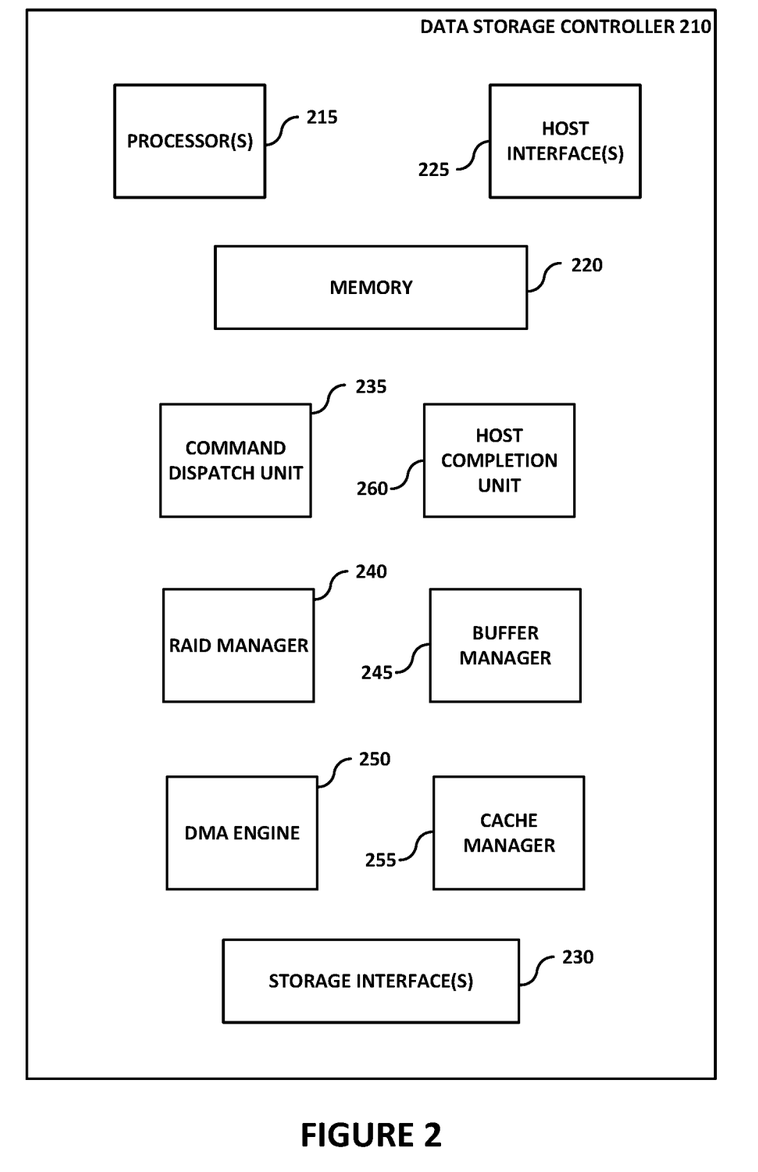
FIG. 2 is a block diagram illustrating components of a data storage controller according to aspects of the subject technology.

FIG. 2 is a block diagram illustrating components of a data storage controller, such as data storage controller 110 represented in FIG. 1, according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

In the example depicted in FIG. 2, data storage controller 210 includes one or more processors 215, memory 220, one or more host interfaces 225, and one or more storage interfaces 230. The depicted example of data storage controller 210 further includes command dispatch unit 235, RAID manager 240, buffer manager 245, direct memory access (DMA) engine 250, cache manager 255, and host completion unit 260. These components and various operations of data storage controller 210 are described in more detail below.

According to aspects of the subject technology, processor(s) 215 may include suitable logic, circuitry, and/or code that enable processing data and/or controlling operations of data storage controller 210. In this regard, processor(s) 215 may be configured to load and execute one or more sequences of instructions from firmware stored in memory 220 or in another storage device to initiate and manage operations of data storage controller 210 and to facilitate the exchange of messages between components of data storage controller 210. The messages may include one or more of data, commands, status indicators, etc. associated with the operations of data storage controller 210 and/or access requests received and processed by data storage controller 210. Processor(s) 215 or one or more portions thereof, may be implemented in hardware such as an Application Specific Integrated Circuit (ASIC), a Field Programmable Gate Array (FPGA), a Programmable Logic Device (PLD), a controller, a state machine, gated logic, discrete hardware components, or any other suitable devices and/or a combination of two or more of these devices.

Memory 220 may include suitable logic and/or circuitry that enable storage of various types of information such as received data, generated data, code, and/or configuration information. Memory 220 may include, for example, random access memory (RAM), read-only memory (ROM), flash memory, magnetic storage, optical storage, etc. Portions or all of memory 220 may be arranged external to data storage controller 210. In these alternative configurations, memory 220 may be coupled with data storage controller 210 via a memory interface (now shown).

According to aspects of the subject technology, command dispatch unit 235 may include suitable logic, circuitry, and/or code that enable receiving and processing data access requests received from a host (e.g., host 150), such as host write requests (e.g., requests from the host to write data to a logical drive) and host read requests (e.g., requests from the host to read data from a logical drive). Processing the data access requests may include checking a logical drive (LD) property table maintained by command dispatch unit 235 for parameters of the logical drive to which the data access request is directed. The parameters may include a type of the logical drive (e.g., configuration, RAID type, etc.) and a state of the logical drive (e.g., optimal, degraded, etc.). For example, the parameters may indicate that a logical drive includes two physical drives of different types operating in a RAID level 1 configuration for data redundancy. The parameters may further indicate that the logical drive is in an optimal state where all of the physical drives are operating versus a degraded state where one or more of the physical drives may not be available/functioning.

Processing the host data access requests may further include generating device input-output (IO) requests based on the data access request received from a host (e.g., host 150). The subject technology enables the use of different cache policies for different respective physical drives configured as peer drives in a data-redundancy configuration (e.g., RAID level 1) by generating separate IO requests for the different physical drives and the respective cache policies. For example, command dispatch unit 235 may generate a parent IO request based on the data access request received from the host, and two children IO requests for two different physical drive types, respectively. The children IO requests may include an identifier for the parent IO request and the parent IO request may include a counter whose value may be set to the number of children IO requests generated. As discussed further below, the counter may be used to confirm that all of the children IO requests have been completed before reporting back to the host regarding the status of the host's data access request. Once generated, the children IO requests are routed into respective flows corresponding to the different physical drives and their associated cache policies. For example, one of the children IO requests may be routed to RAID manager 240 for an SSD physical drive operating under a write-through cache policy, and the other child IO request may be routed to buffer manager 245 for an HDD physical drive operating under a write-back cache policy. These flows are discussed further below.

According to aspects of the subject technology, RAID manager 240 may include suitable logic, circuitry, and/or code that enable managing data IO operations across a redundant array of physical drives, such as SSD 130 and HDD 140, according to a RAID level configuration selected for the redundant array of physical drives. The subject technology is not limited to any particular RAID configurations and may be implemented for both RAID and non-RAID configurations that utilize redundant data storage devices. Management of the data IO operations may include issuing data instructions (e.g., read, write, erase) to the individual physical drives to maintain data mirroring and/or data striping as needed to implement the selected RAID level configuration. RAID manager 240 also may be configured to determine parity information for data being stored in the array of physical drives, if applicable to the selected RAID level configuration.

According to aspects of the subject technology, buffer manager 245 may include suitable logic, circuitry, and/or code that enable support of caching operations, such as a write-back cache policy. For example, buffer manager 245 may receive a child IO request generated by command dispatch unit 235 in connection with a data access request received from a host. Based on the received child IO request, buffer manager 245 may be configured to allocate buffer resources such as internal scattergather lists and buffer segments for caching the data indicated in the child IO request. In addition, buffer manager 245 may be configured to communicate parameters to DMA engine 250 for transferring data indicated in a data access request received from a host between the requesting host and the allocated buffer segments.

According to aspects of the subject technology, DMA engine 250 may include suitable logic, circuitry, and/or code that enable initiating and executing a direct memory access operation to transfer data between the host and the allocated buffer segments. The parameters for the direct memory access operation may be received from buffer manager 245. DMA engine 250 may be configured further to notify cache manager 255 of the completion of the direct memory access operation. In addition to transferring data between the host and the allocated buffer segments, DMA engine 250 may be configured to transfer data between the host and a redundant array of independent disks.

According to aspects of the subject technology, cache manager 255 may include suitable logic, circuitry, and/or code that enable management of the caching of data in support of caching policies such as a write-back caching policy. Cache manager 255 may be configured to stitch the newly transferred data in the buffer segments into a cache memory. The cache memory may be part of memory 220 or a component separate from memory 220 either internal or external to data storage controller 210. In addition, cache manager 255 may be configured further to execute flush operations to remove dirty data from the cache memory.

According to aspects of the subject technology, host completion unit 260 may include suitable logic, circuitry, and/or code that enable preparing and communicating messages with a host regarding data access requests received from the host. For example, host completion unit 260 may be configured to notify the host about the completion of a host write request based on RAID manager 240 confirming that the first and second child IO requests were successfully completed.

The components of data storage controller 210 discussed above, or one or more portions thereof, may be implemented in software/firmware (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Host interface(s) 225 may include suitable circuitry, logic, and/or code that enable the communication of data between a host and data storage controller 210. The subject technology is not limited to any particular protocol and/or configuration. For example, host interface(s) 225 may implement an interface to facilitate the transfer of message passing interface (MPI) SCSI messages between the host and data storage controller 210. Network interfaces 240 may be configured and controlled by processor(s) 215 executing code and/or applications stored in memory 220.

Similarly, storage interface(s) 230 may include suitable circuitry, logic, and/or code that enable the communication of data between data storage controller 210 and the physical drives in the array of a logical drive. The subject technology is not limited to any particular protocol and/or configuration. For example, storage interface(s) 230 may implement SCSI, NVMe, SAS, SATA, etc. interfaces to facilitate the transfer of data between data storage controller 210 the physical drives forming the array used for a RAID configuration. Storage interface(s) 230 may be configured and controlled by processor(s) 215 executing code and/or applications stored in memory 220.

According to aspects of the subject technology, the components of data storage controller 210 may be implemented as a single device such as an ASIC or an FPGA. Alternatively, two or more subsets of the components of data storage controller 210 may be implemented into two or more respective devices with appropriate interfaces configured to communicate messages, commands, etc. between components on the different respective devices.

Figure 3:
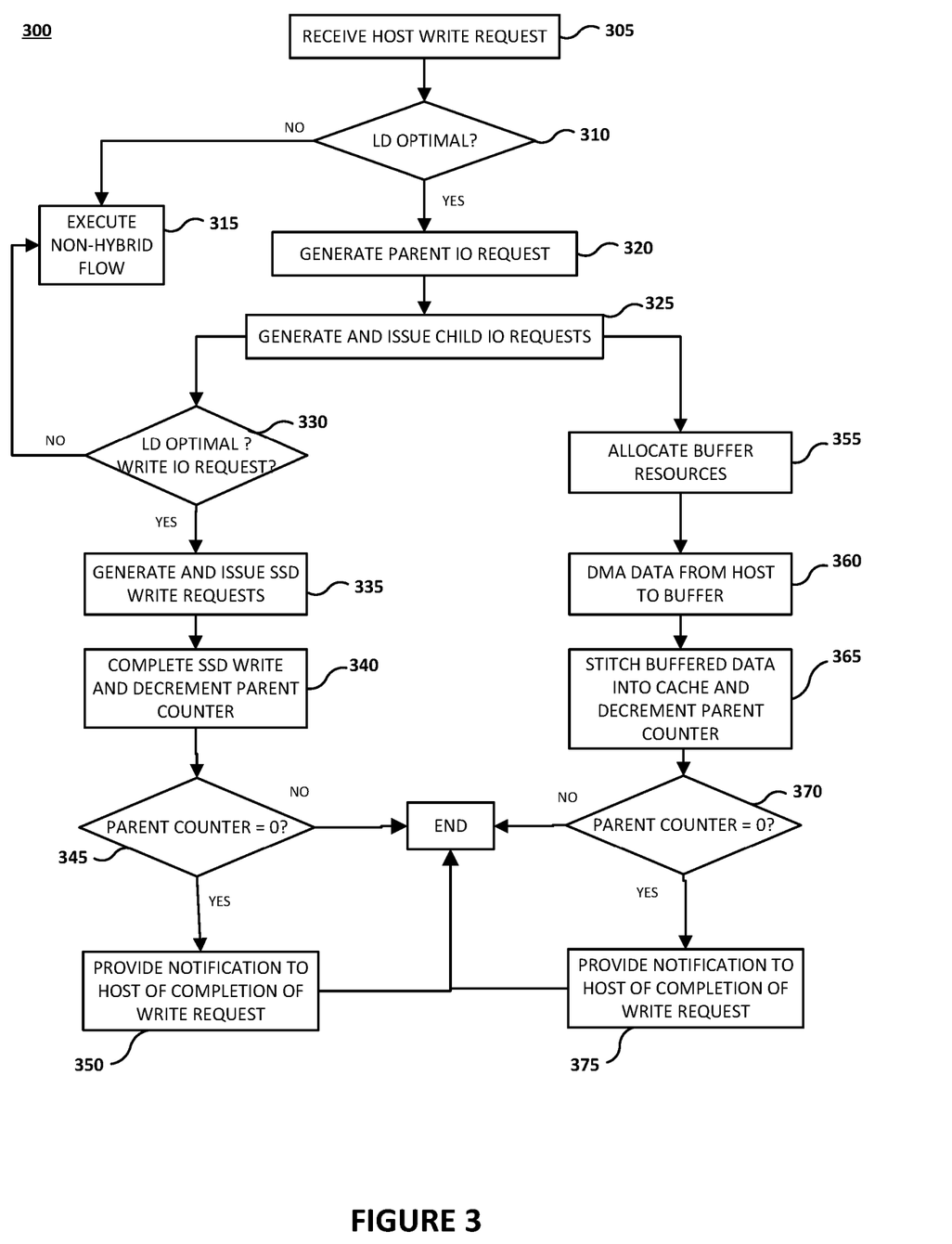
FIG. 3 is a flowchart depicting an example process for a host write request according to aspects of the subject technology.

FIG. 3 is a flowchart depicting an example process 300 for a host write request according to aspects of the subject technology. For explanatory purposes, the blocks of the illustrated process may be described herein as occurring in serial or linearly. However, two or more blocks of the illustrated process may be performed in parallel. In addition, the blocks depicted in FIG. 3 may be performed in a different order from that shown and the process may not perform one or more of the illustrated blocks and/or may include one or more additional blocks. Process 300 will be described with references to components of data storage controller 210 depicted in FIG. 2 and described above. The subject technology is not limited to this example and may be implemented using other configurations of data storage controllers.

According to aspects of the subject technology, process 300 includes the command dispatch unit receiving a host write request for a logical drive from a host (block 305) and checking the host write request against a logical drive property table to determine the configuration of the logical drive and if the logical drive's state is optimal (block 310). The logical drive configuration of the subject technology in which physical drives are paired with peer physical drives of different respective types for data mirroring purposes and are operating using different cache policies may be referred to as hybrid RAID levels or configurations. The logical drive referenced in the host write request may be checked against logical drive property table to determine the current organization and state of the logical drive (block 310). If the logical drive is determined to be in a degraded state, where one or more physical drives is not available, rather than an optimal state, the host write request may be processed using a conventional non-hybrid process flow (block 315).

If the logical drive is configured as a hybrid RAID level and the current state is optimal, the command dispatch unit generates a parent IO request based on the host write request (block 320), and children IO requests for the different respective physical drives and cache policies (block 325). The children IO requests may reference the parent IO request to link them together. In addition, the parent IO request includes a counter that may be set to a value corresponding to the number of children IO requests generated.

The child IO request for an SSD operating under a write-through cache policy may be directed to a RAID manager (block 325). The RAID manager may check the logical drive against a logical drive property table to confirm the logical drive's state is currently optimal and that the child IO request is a write IO request (block 330). If the logical drive state is optimal and the child IO request is a write IO request, the RAID manager generates and issues an SSD write request to an SSD in the array of the logical drives (block 335). The SSD notifies the RAID manager of the successful completion of the write IO request and the RAID manager decrements the counter value in the parent IO request to reflect the completion of one of the children IO requests (block 340). If decrementing the counter value results in the counter value being zero (block 345), indicating that all of the children IO requests have been completed, the RAID manager provides notification to the host completion unit, which notifies the host about the completion of the write IO request (block 350). Otherwise, this leg of the process ends.

The child IO request for an HDD operating under a write-back cache policy, for example, may be directed to a buffer manager which allocates resources (e.g., scattergather lists, buffer segments, etc.) for the child IO request (block 355). The buffer manager also may provide DMA parameters to a DMA engine which executes a DMA operation according to the parameters to transfer data from the host to the allocated buffer segments (block 360). The cache manager is informed of the completion of the DMA transfer and stitches the data in the buffer segments into the cache and decrements the counter value in the parent IO request (block 365) to reflect the completion of the data caching. Similar to the RAID manager, if the cache manager determines that decrementing the counter value in the parent IO request results in the counter value being zero (block 370), indicating that all children IO requests have been completed, the cache manager provides notification to the host completion unit, which notifies the host about the completion of the write IO request (block 375).

According to aspects of the subject technology, the counter value in the parent IO request may be stored in a shared memory location in memory 220, for example, that is accessible to multiple components of data storage controller 210. To avoid simultaneous access issues that may arise when multiple components of data storage controller 210 are trying to access the counter value, access to the counter value may be provided in a locked/atomic manner such that only one component has access to the counter at a time to change the stored value and/or read out the stored valued.

Figure 4:
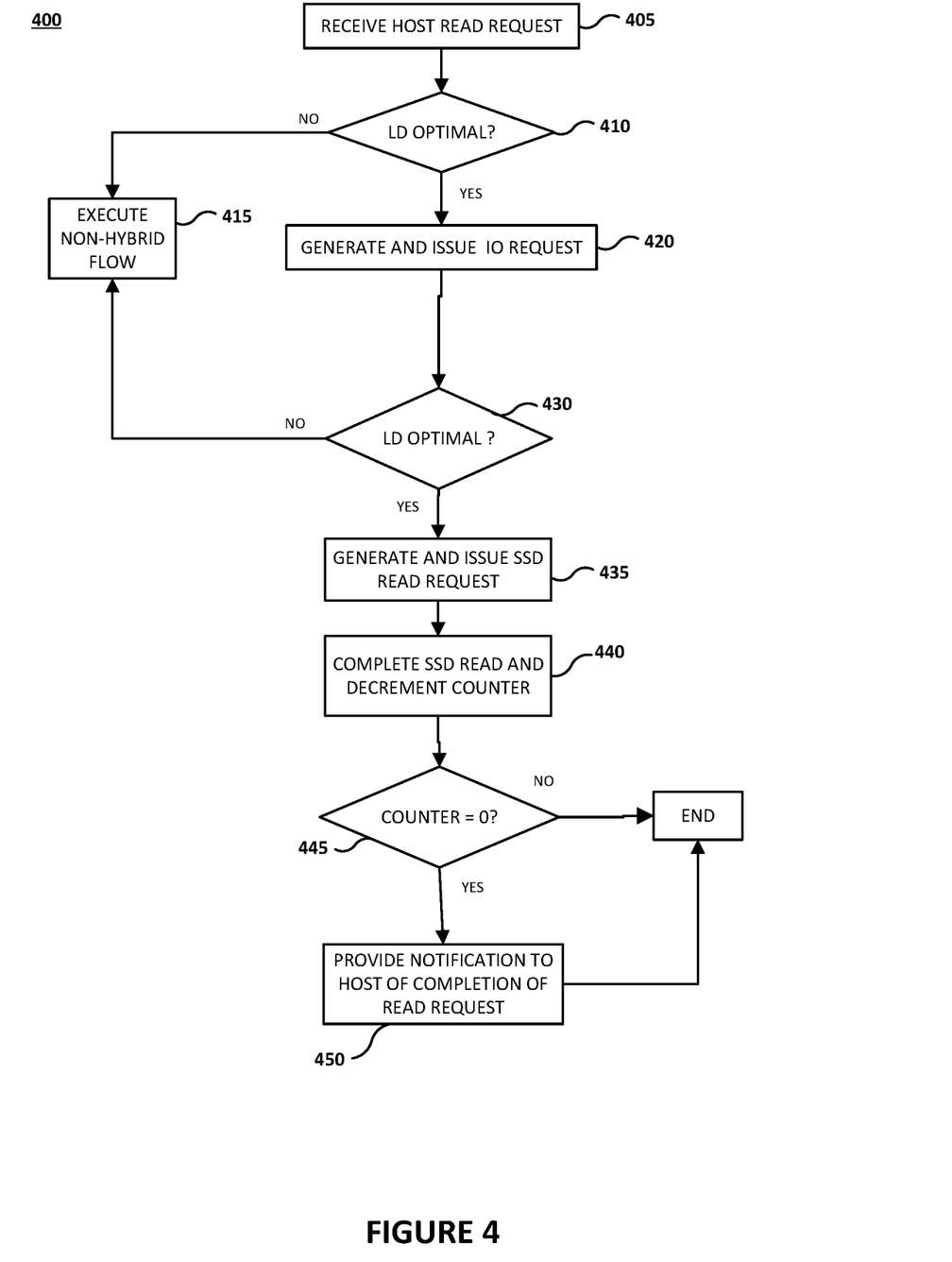
FIG. 4 is a flowchart depicting an example process for a host read request according to aspects of the subject technology.

FIG. 4 is a flowchart depicting an example process 400 for a host read request according to aspects of the subject technology. For explanatory purposes, the blocks of the illustrated process may be described herein as occurring in serial or linearly. However, two or more blocks of the illustrated process may be performed in parallel. In addition, the blocks depicted in FIG. 4 may be performed in a different order from that shown and the process may not perform one or more of the illustrated blocks and/or may include one or more additional blocks. Process 400 will be described with references to components of data storage controller 210 depicted in FIG. 2 and described above. The subject technology is not limited to this example and may be implemented using other configurations of data storage controllers.

According to aspects of the subject technology, process 400 includes the command dispatch unit receiving a host read request from a host (block 405). As with the host write request, the command dispatch unit checks a logical drive property table to determine the logical drive to which the host read request is directed is in an optimal state and the logical drive is configured with a hybrid RAID configuration (block 410). If the logical drive is in an optimal state and has the hybrid configuration, the command dispatch unit generates and issues an IO request to the RAID manager (block 420). Otherwise, the host read request is processed according to conventional techniques (block 415). Because the logical drive is configured with peer physical drives mirroring data, only one IO request may be generated and issued by the command dispatch unit to read the data from one of the physical drives in the logical drive.

The RAID manager may confirm that the logical drive associated with the host read request is in an optimal state (block 430) and generate and issue an IO request to the SSD (block 435). When the SSD completes the IO request the RAID manager is notified and a counter associated with the host read request is decremented to reflect completion of IO request (block 440). If the counter value has reached zero indicating that the host read request has been completed, the RAID manager may notify the host completion unit of the change in status, which may notify the host regarding the completion of the host read request (block 450).

Figure 5:
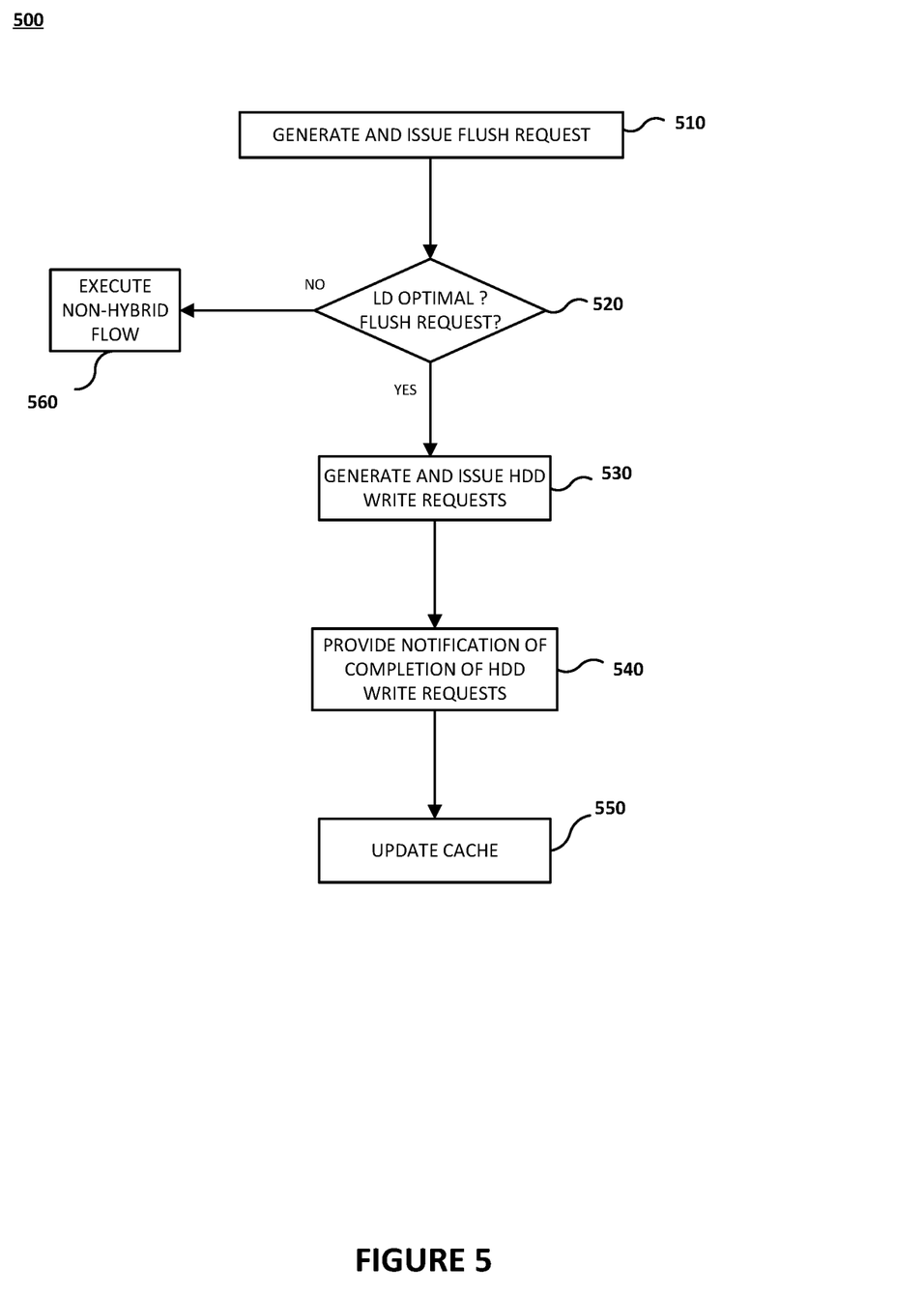
FIG. 5 is a flowchart depicting an example process for a cache flush request according to aspects of the subject technology.

FIG. 5 is a flowchart depicting an example process 500 for a cache flush request according to aspects of the subject technology. For explanatory purposes, the blocks of the illustrated process may be described herein as occurring in serial or linearly. However, two or more blocks of the illustrated process may be performed in parallel. In addition, the blocks depicted in FIG. 5 may be performed in a different order from that shown and the process may not perform one or more of the illustrated blocks and/or may include one or more additional blocks. Process 500 will be described with references to components of data storage controller 210 depicted in FIG. 2 and described above. The subject technology is not limited to this example and may be implemented using other configurations of data storage controllers.

According to aspects of the subject technology, the cache manager may periodically generate and issue a flush request to the RAID manager (block 510). The RAID manager may confirm that the logical drive is in an optimal state and is configured using the hybrid approach described above (block 520). If the logical drive is in an optimal state, the RAID manager may be configured to issue write IO requests to the HDD physical drive to flush the dirty cache values from the cache (block 530). The HDD notifies the RAID manager of the completion of the flush operations which notifies the cache manager (block 540). The cache manager updates the cache after the flush has been completed (block 550).

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multicore processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

According to aspects of the subject technology, a data storage controller is provided that includes: a computer-readable storage medium storing one or more sequences of instructions; and one or more processors configured to execute the one or more sequences of instructions to: receive a host write request for a logical drive corresponding to a redundant array of physical drives, wherein the redundant array of physical drives comprises a first physical drive of a first drive type and a second physical drive of a second drive type different from the first drive type, and wherein data stored on the first physical drive is mirrored on the second physical drive; generate and issue a first input-output (IO) request for the first physical drive based on the host write request and a first cache policy associated with the first drive type; and generate and issue a second IO request for the second physical drive based on the host write request and a second cache policy associated with the second drive type, wherein the first cache policy is different from the second cache policy.

The first drive type may be a solid-state drive (SSD), and the second drive type may be a hard disk drive (HDD). The first physical drive may comprise a nonvolatile memory express (NVMe) interface. The second physical drive may comprise a serial-attached small computer system (SAS) interface or a serial advanced technology attachment (SATA) interface. The first cache policy may be a write-through cache policy. The second cache policy may be a write-back cache policy.

The one or more processors are further configured to execute the one or more sequences of instructions to: generate a parent IO request corresponding to the host write request, wherein the first IO request and the second IO request are associated with the parent IO request; and set a counter value in the parent IO request to a number representing the number of IO requests associated with the parent IO request. The counter value in the parent IO request may be decremented by one upon completion of the first IO request or upon completion of the second IO request. The one or more processors may be further configured to execute the one or more sequences of instructions to: determine that the counter value in the parent IO request is decremented to zero; and provide a notification to a host that the host write request is complete in response to the counter value being decremented to zero.

According to aspects of the subject technology, a non-transitory computer-readable storage medium is provided storing instructions which, when executed by one or more processors, cause the one or more processors to perform operations comprising: receiving a host write request for a logical drive corresponding to a redundant array of physical drives, wherein the redundant array of physical drives comprises a first physical drive of a first drive type and a second physical drive of a second drive type different from the first drive type, and wherein data stored on the first physical drive is mirrored on the second physical drive; generating and issuing a first input-output (IO) request for the first physical drive based on the host write request and a write-through cache policy associated with the first drive type; and generating and issuing a second IO request for the second physical drive based on the host write request and a write-back cache policy associated with the second drive type.

The operations may further include generating a parent IO request corresponding to the host write request, wherein the first IO request and the second IO request are associated with the parent IO request; and setting a counter value in the parent IO request to a value representing a number of IO requests associated with the parent IO request. Decrementing the counter value in the parent IO request by one upon completion of the first IO request or upon completion of the second IO request. The operations may further include determining that the counter value in the parent IO request is decremented to zero; and providing a notification to a host that the host write request is complete in response to the counter value being decremented to zero. The first drive type is a solid-state drive (SSD), and the second drive type is a hard disk drive (HDD). The first physical drive may comprise a nonvolatile memory express (NVMe) interface, and the second physical drive may comprise a serial-attached small computer system (SAS) interface or a serial advanced technology attachment (SATA) interface.

According to aspects of the subject technology, a data storage system is provided that includes: a redundant array of physical drives including a solid-state drive (SSD) and a hard disk drive (HDD), wherein data stored on the SSD is mirrored on the HDD; and a data storage controller configured to execute host input-output (IO) requests in the redundant array of physical drives. The data storage controller includes a computer-readable storage medium storing one or more sequences of instructions; and one or more processors configured to execute the one or more sequences of instructions to: receive a host write request for a logical drive corresponding to the redundant array of physical drives; generate and issue a first IO request for the SSD based on the host write request and a first cache policy associated with the SSD; and generate and issue a second IO request for the HDD based on the host write request and a second cache policy associated with the HDD, wherein the first cache policy is different from the second cache policy.

The SSD may comprise a nonvolatile memory express (NVMe) interface, and the HDD may comprise a serial-attached small computer system (SAS) interface or a serial advanced technology attachment (SATA) interface. The first cache policy is a write-through cache policy, and the second cache policy is a write-back cache policy. The data storage system of claim 16, wherein the one or more processors are further configured to execute the one or more sequences of instructions to: generate a parent IO request corresponding to the host write request, wherein the first IO request and the second IO request are associated with the parent IO request; and set a counter value in the parent IO request to a value representing a number of IO requests associated with the parent IO request, wherein the counter value in the parent IO request is decremented by one upon completion of the first IO request or upon completion of the second IO request. Wherein the one or more processors may be further configured to execute the one or more sequences of instructions to: determine that the counter value in the parent IO request is decremented to zero; and provide a notification to a host that the host write request is complete in response to the counter value being decremented to zero.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A data storage controller, comprising:
   a computer-readable storage medium storing one or more sequences of instructions; and
   one or more processors configured to execute the one or more sequences of instructions to:
   receive a host write request for a logical drive corresponding to a redundant array of physical drives, wherein the redundant array of physical drives comprises a first physical drive of a first drive type and a second physical drive of a second drive type different from the first drive type, and wherein data stored on the first physical drive is mirrored on the second physical drive;
   generate and issue a first input-output (IO) request for the first physical drive based on the host write request and a first cache policy associated with the first drive type; and
   generate and issue a second IO request for the second physical drive based on the host write request and a second cache policy associated with the second drive type,
   wherein the first cache policy is different from the second cache policy.

2. The data storage controller of claim 1, wherein the first drive type is a solid-state drive (SSD), and the second drive type is a hard disk drive (HDD).

3. The data storage controller of claim 2, wherein the first physical drive comprises a nonvolatile memory express (NVMe) interface.

4. The data storage controller of claim 2, wherein the second physical drive comprises a serial-attached small computer system (SAS) interface or a serial advanced technology attachment (SATA) interface.

5. The data storage controller of claim 1, wherein the first cache policy is a write-through cache policy.

6. The data storage controller of claim 1, wherein the second cache policy is a write-back cache policy.

7. The data storage controller of claim 1, wherein the one or more processors are further configured to execute the one or more sequences of instructions to:
   generate a parent IO request corresponding to the host write request, wherein the first IO request and the second IO request are associated with the parent IO request; and
   set a counter value in the parent IO request to a value representing a number of IO requests associated with the parent IO request.

8. The data storage controller of claim 7, wherein the counter value in the parent IO request is decremented by one upon completion of the first IO request or upon completion of the second IO request.

9. The data storage controller of claim 8, wherein the one or more processors are further configured to execute the one or more sequences of instructions to:
   determine that the counter value in the parent IO request is decremented to zero; and
   provide a notification to a host that the host write request is complete in response to the counter value being decremented to zero.

10. A non-transitory computer-readable storage medium storing instructions which, when executed by one or more processors, cause the one or more processors to perform operations comprising:
    receiving a host write request for a logical drive corresponding to a redundant array of physical drives, wherein the redundant array of physical drives comprises a first physical drive of a first drive type and a second physical drive of a second drive type different from the first drive type, and wherein data stored on the first physical drive is mirrored on the second physical drive;
    generating and issuing a first input-output (IO) request for the first physical drive based on the host write request and a write-through cache policy associated with the first drive type; and
    generating and issuing a second IO request for the second physical drive based on the host write request and a write-back cache policy associated with the second drive type.

11. The non-transitory computer-readable storage medium of claim 10, wherein the operations further comprise:
    generating a parent IO request corresponding to the host write request, wherein the first IO request and the second IO request are associated with the parent IO request; and
    setting a counter value in the parent IO request to a value representing a number of IO requests associated with the parent IO request.

12. The non-transitory computer-readable storage medium of claim 11, wherein the operations further comprise:
    decrementing the counter value in the parent IO request by one upon completion of the first IO request or upon completion of the second IO request.

13. The non-transitory computer-readable storage medium of claim 12, wherein the operations further comprise:
    determining that the counter value in the parent IO request is decremented to zero; and
    providing a notification to a host that the host write request is complete in response to the counter value being decremented to zero.

14. The non-transitory computer-readable storage medium of claim 10, wherein the first drive type is a solid-state drive (SSD), and the second drive type is a hard disk drive (HDD).

15. The non-transitory computer-readable storage medium of claim 14, wherein the first physical drive comprises a nonvolatile memory express (NVMe) interface, and the second physical drive comprises a serial-attached small computer system (SAS) interface or a serial advanced technology attachment (SATA) interface.

16. A data storage system, comprising:
   a redundant array of physical drives including a solid-state drive (SSD) and a hard disk drive (HDD), wherein data stored on the SSD is mirrored on the HDD; and
   a data storage controller configured to execute host input-output (IO) requests in the redundant array of physical drives, wherein the data storage controller comprises:
      a computer-readable storage medium storing one or more sequences of instructions; and
      one or more processors configured to execute the one or more sequences of instructions to:
         receive a host write request for a logical drive corresponding to the redundant array of physical drives;
         generate and issue a first IO request for the SSD based on the host write request and a first cache policy associated with the SSD; and
         generate and issue a second IO request for the HDD based on the host write request and a second cache policy associated with the HDD,
         wherein the first cache policy is different from the second cache policy.

17. The data storage system of claim 16, wherein the SSD comprises a nonvolatile memory express (NVMe) interface, and the HDD comprises a serial-attached small computer system (SAS) interface or a serial advanced technology attachment (SATA) interface.

18. The data storage system of claim 16, wherein the first cache policy is a write-through cache policy, and the second cache policy is a write-back cache policy.

19. The data storage system of claim 16, wherein the one or more processors are further configured to execute the one or more sequences of instructions to:
   generate a parent IO request corresponding to the host write request, wherein the first IO request and the second IO request are associated with the parent IO request; and
   set a counter value in the parent IO request to a value representing a number of IO requests associated with the parent IO request,
   wherein the counter value in the parent IO request is decremented by one upon completion of the first IO request or upon completion of the second IO request.

20. The data storage system of claim 19, wherein the one or more processors are further configured to execute the one or more sequences of instructions to:
   determine that the counter value in the parent IO request is decremented to zero; and
   provide a notification to a host that the host write request is complete in response to the counter value being decremented to zero.

\* \* \* \* \*